United States Patent [19]
Burgess

[11] 3,959,110
[45] *May 25, 1976

[54] APPARATUS FOR SILVER RECOVERY

[75] Inventor: Kenneth G. Burgess, Derby, N.Y.

[73] Assignee: Hydrospace Industries, Inc., Buffalo, N.Y.

[*] Notice: The portion of the term of this patent subsequent to Dec. 16, 1992, has been disclaimed.

[22] Filed: Apr. 8, 1974

[21] Appl. No.: 458,465

Related U.S. Application Data

[63] Continuation-in-part of Ser. No. 350,464, April 12, 1973.

[52] U.S. Cl. .............................. 204/229; 204/109; 204/273; 204/275; 259/DIG. 46
[51] Int. Cl.² .................... B65D 69/00; A24F 15/00
[58] Field of Search .......... 204/109, 229, 273, 275, 204/272; 259/DIG. 46

[56] References Cited
UNITED STATES PATENTS

| | | | |
|---|---|---|---|
| 951,311 | 3/1910 | Hartman | 204/229 X |
| 2,655,011 | 10/1953 | Ihle et al. | 259/DIG. 46 |
| 3,418,225 | 12/1968 | Wick et al. | 204/109 |
| 3,477,926 | 11/1969 | Snow et al. | 204/109 |
| 3,546,089 | 12/1970 | Schneider | 204/275 X |
| 3,694,341 | 9/1972 | Luck, Jr. | 204/273 |
| 3,715,291 | 2/1973 | Bentley | 204/229 X |

FOREIGN PATENTS OR APPLICATIONS

| | | | |
|---|---|---|---|
| 916,438 | 1/1963 | United Kingdom | 204/272 |

*Primary Examiner*—T. M. Tufariello
*Attorney, Agent, or Firm*—Raymond F. Kramer

[57] ABSTRACT

Silver is electrolytically recovered from photographic solutons, such as spent hypo, by feeding such a solution to a precollecting or measuring vessel where the solution collects until a predetermined volume has been received, at which time it is automatically dispensed, by a self-triggering siphon, into an electrolysis chamber of larger volume than the pre-collecting vessel and direct current is automatically turned on for a predetermined flow between an anode and a cathode in the chamber to plate out the silver on the cathode. An agitator, preferably a magnetic agitator, is also automatically energized to keep the solution homogeneously mixed during electrolysis, for maximum silver recovery efficiency.

15 Claims, 8 Drawing Figures

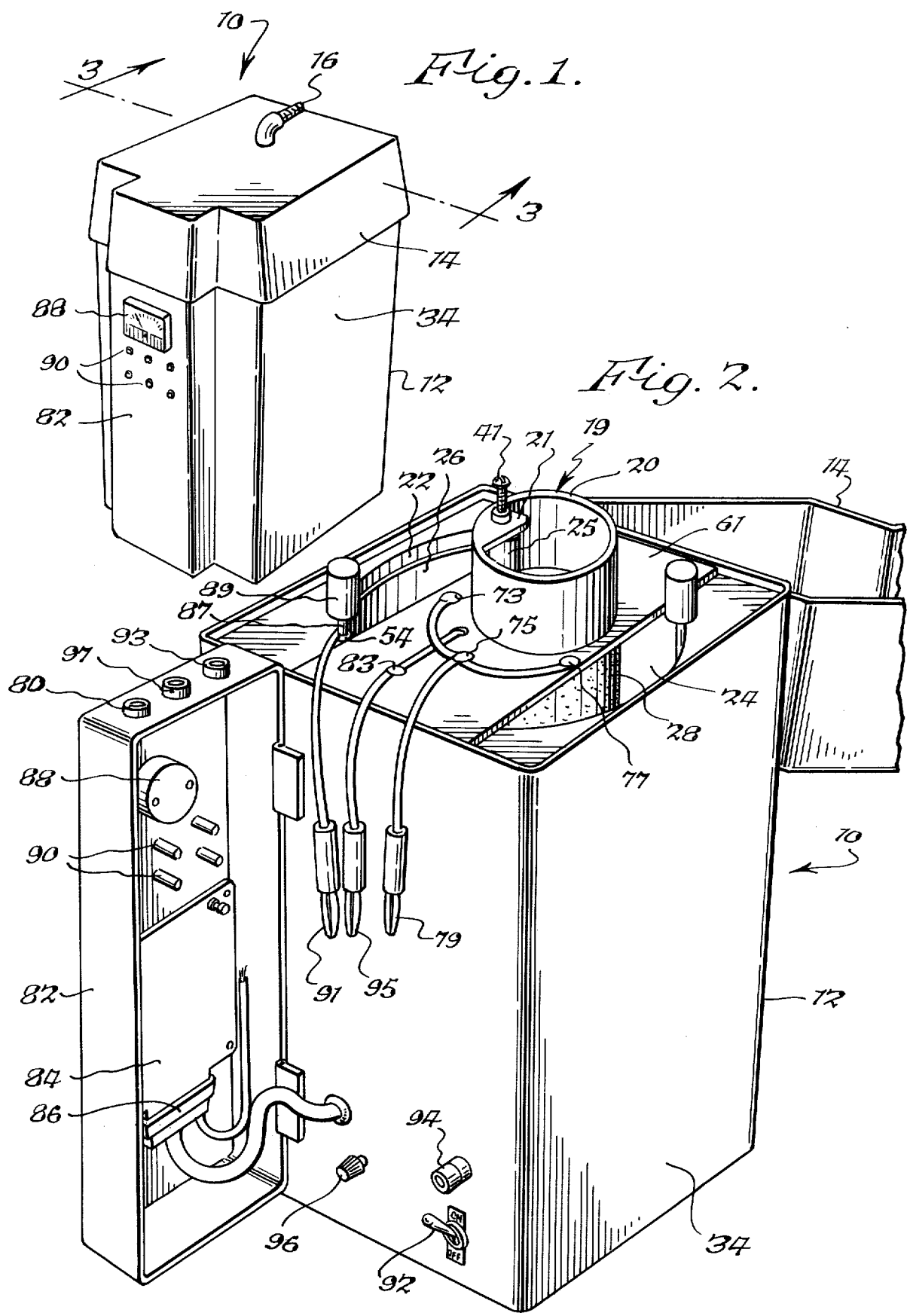

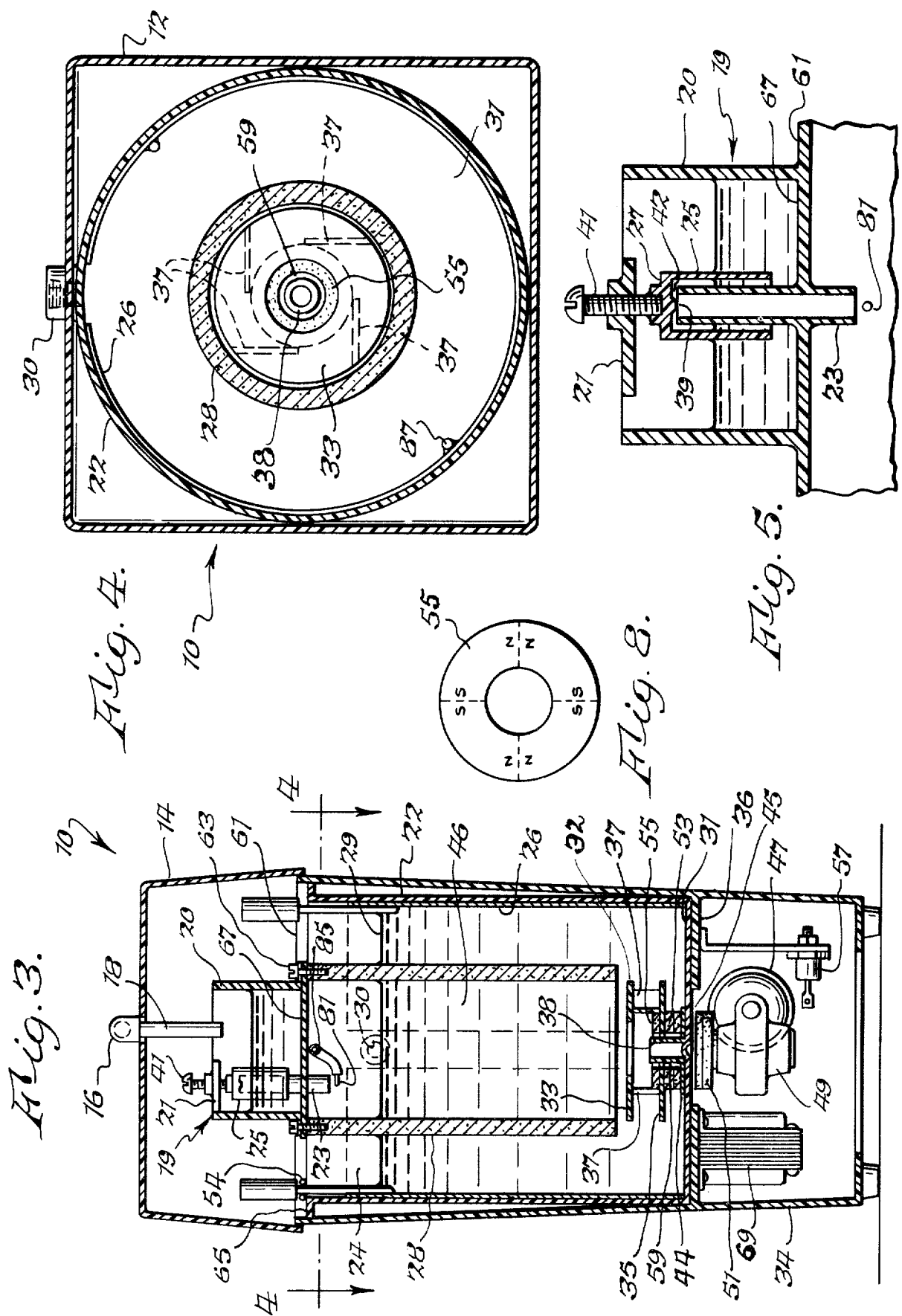

APPARATUS FOR SILVER RECOVERY

REFERENCE TO EARLIER U.S. PATENT APPLICATION

This application is a continuation-in-part of my patent application Ser. No. 350,464, filed Apr. 12, 1973.

BACKGROUND OF THE INVENTION

1. Field of the Invention

This invention relates to silver recovery from spent photographic solutions, and in particular to an automatic apparatus or system which is particularly useful for recovering silver from spent photographic, x-ray or copying solutions used in chemical printing, developing and copying processes.

2. Description of the Prior Art

In photographic, x-ray and motion picture-type films, a sensitive emulsion is employed to record light or x-ray impressions on the film. The chief constituent of this sensitive emulsion is silver bromide but silver chloride is also used and sometimes a combination of these is employed. When light or x-rays strike the granules of silver bromide or other light-sensitive silver salt in a photographic emulsion, a few atoms of metallic silver are formed in each of the granules. The intensity of the impinging radiation determines the number of metallic silver atoms formed. Granules of the silver bromide containing metallic silver are thereby sensitized, and can be reduced to metallic silver by an organic reducing agent or developer. The developer reduces the exposed granules more easily than the unexposed granules, and by chemically controlling the developer action the non-sensitized regions of the film remain unchanged. The film is then passed through a second chemical solution known as a fixative (commonly called hypo) where a second and very unique action occurs. The unsensitized areas, still containing silver bromide and/or chloride, are washed of the silver salts, which pass into the hypo. When the hypo becomes diminished in fixing power and has to be replaced it contains, in dissolved form, the silver removed from the film. Similar reactions occur in making prints from negatives. In photographic studios, motion picture laboratories, industrial x-ray centers and hospitals, the silver in spent hypo solutions is often wasted by being passed out of the processor directly to the drain, but may sometimes be subjected to recovery.

To date, the most popular system of silver recovery in institutions such as hospitals and photographic arts companies has been the canister method. The system is ineffective for a number of reasons. The canister is usually nothing more than a bucket, ranging in capacity from 5 to 50 gallons, containing iron wool with a number of passages through it, depending upon the manufacturer's design. As the silver-laden solution passes through the iron wool, the iron ions replace the silver ions in solution and metallic silver in the form of sludge appears within the iron mesh. The silver is present with a number of other chemicals and chemical compounds, e.g., iron and iron sulfide, and a multi-stage refining operation is required before any acceptable level of silver purity is attained. The cost of the system is relatively small, varying, depending on size, between $16.00 and $200.00, but it can never be re-used. Additionally, the canister itself has a limited life, because only a certain number of gallons of solution can pass through it before all of its silver removal power is gone.

The canister also decreases in efficiency with age, due to internal oxidation and a number of physical reactions undergone as the solution deposits silver in the iron mesh. Typical efficiencies average about 30% to 70%, based on the recoverable silver passed into the canister in solution. A typical life expectancy for such a unit in a hospital or comparable operation is about one month or long enough to treat about 200 gallons of solution.

A second system for removing silver from solution is called "zincing." The system consists of salting or doping large quantities of spent hypo solution with zinc flakes. The solution is then drained off, leaving large quantities of precipitated silver sludge, which must be refined. The operation of this system requires the storing of solutions, which are subsequently usually sold to a zincing operation at a fraction of the solutions' silver worths. In addition, the system is laborious and space-consuming, requiring large users of hypo solution to maintain considerable storage facilities, usually in areas where space is critically needed. The system is a source of only marginal revenue to the hospital in most cases, considering the worth of silver contained in such solutions.

A third system or method for removing silver from hypo solutions is electrolysis or electroplating. This system has the capability of being the most efficient of all processes, due to the fact that the silver is reclaimed in nearly pure form (92% to 99%). However electroplating is also disadvantageous in several ways. It involves a large capital outlay and only when the apparatus and process are automatic and comparatively maintenance-free is it of demonstrable superiority. The prior art machinery normally marketed does not contain simple and reliable automated control apparatuses and usually requres considerable attention. If a machine is left unattended, it will continue at a given current level regardless of fluid flow or solution density, and will decrease in efficiency by losing silver, or begin to cause sulfide formation, noxious gas emission and diminution in the purity of the silver already plated. Operations at voltages and current densities higher than needed place undue strains on parts of the apparatus and the resulting gases emitted can cause considerable discomfort in the area in which the machinery is located. The hydrogen sulfide which can be produced is of a very offensive rotten egg odor which can be a cause for rejection of the apparatus or system for use in quarters also occupied by personnel, as in hospitals and photographic laboratories.

Machines have been marketed with a number of control mechanisms, including concentration sensors, ion migration sensing controls, feed controls, voltage and current regulators and timers, in an effort to have the plating operation conducted most efficiently without production of undesirable byproducts. However, such machines and systems often require adjustment of feed rates or other changes in the feed, with secondary adjustments often being needed so that the machines are not truly automatic, as is the present machine. The prior art machines are often unreliable and are considerably more expensive due to additional equipment included in them. Prior art machines often have employed rotation of the cathode or anode for agitation. Such systems require motorization large enough to carry the final full laden weight of the respective elements and in addition, require direct mechanical connections to be made in a difficult atmosphere. The cathode rotation system also requires that rotation be maintained at a significant speed, most commonly about 170 revolutions per minute (r.p.m.) which may, due to centrifugal forces involved, cause premature flaking from the cathode and may retard plating efficiency at low silver density concentrations. In addition, power transfer to the moving electrode at the high currents necessary is difficult and unreliable.

OBJECTS OF THE INVENTION

It is an object of the present invention to provide improved silver recovery systems which operate apparatuses and processes automatically at various spent solution feed rates, without the necessity for operator supervision or control, which do not produce any noxious gases and which are easily serviced for checking and removing the plated silver.

It is also an important object of the invention to provide an improved silver recovery unit that is not subject to the above-mentioned disadvantages of the prior art, due to its use of stationary and easily removable electrodes, volume controlled feed, automatically related electrolysis and improved agitation of the electrolyte.

SUMMARY OF THE INVENTION

The generic electrolytic apparatus embodiment of the invention for recovering silver from photographic solutions comprises (a) an electrolysis vessel having an electrolysis chamber therein; (b) an anode in said chamber; (c) a cathode in said chamber; (d) means for circulating electrolyte within said chamber into contact with the cathode; (e) means for intermittently volumetrically feeding a photographic solution from which silver is to be recovered to the electrolysis chamber; and (f) means responsive to the feeding of the feed solution to the chamber, for passing a plating current of electricity between said anode and cathode and through a solution of electrolyte in said electrolysis chamber in predetermined quantity to plate out silver on the cathode in an amount which is from a substantial proportion to all of the silver in the volume of feed solution fed to the electrolysis chamber which is recoverable by plating.

Preferred embodiments of such apparatus include particular types of feed measuring and discharging devices, agitators, coupling means to connect drive means to the agitators, electrodes and electronic means for causing the apparatus to count (in effect) the number of discharges to the electrolysis chamber and pass the requisite amounts of electricity between the electrodes to plate out the silver contents of the volumes charged. Important apparatus aspects of the invention relate to readily removable electrodes, a self-triggering siphon feed device, magnetic coupled impeller drives and magnetic agitators. Corresponding processes are also within the invention.

The apparatuses and methods are especially useful for recovering silver from spent photographic solutions resulting from x-ray development on site in hospitals, wherein the spent solutions are fed, as they are generated, into the pre-collecting vessel of the present silver recovery unit, with the effluent being recycled to a photographic process step or being sewered. The pre-collecting vessel holds the spent photographic solution, normally including sodium thiosulfate and other fixing solution chemicals, until a predetermined volume, e.g., 500 ml., is collected, at which time such volume of solution is automatically dispensed into an electrolysis chamber and an electrolyzing current is automatically passed between a cathode and an anode in the electrolysis chamber for a predetermined time period to plate out the silver on the cathode. The electrolyte (the remains of the spent solutions charged, after at least partial electrolysis thereof) is kept mixed during the period when it is undergoing electrolysis by a magnetically coupled impeller, pump or agitator located at or near the bottom of the electrolysis chamber. Good mixing is effected without foaming of the electrolyte and is an important reason why excellent plating is obtained, without pitting or flaking, which could otherwise occur, possibly due to hydrogen generation. Also there is no production of undesirable hydrogen sulfide and any losses of silver in the overflow electrolyte being discharged are minimal. Such losses are held to as little as 0 to 8%, rarely exceeding 5% and usually are about 1% or less (the discharge fluid generally analyzes 0.0% recoverable silver but a small percentage may be lost as non-recoverable sulfite). The discharge opening (overflow) is located near the top of the electrolysis chamber to maintain the chamber full, up to a predetermined level.

A preferred anodic electrode is graphite, which may be of hollow parabolic or cylindrical shape. It is normally positioned vertically. The parabolic shape has been found to provide good silver distribution in the electrolyte and minimizes frothing but the cylindrical shape is also acceptable and often is preferable due to its greater stability, ease of manufacture and uniform surface area. A hinged cover is located over the electrolysis chamber and may be readily removed for easy viewing of the chamber contents. The cathode and anode are both easily removed simply by pulling each upwardly out of the chamber. In the case of the cathode, it may be flexed to assist in such ready removal, forming a smaller split cylinder so as to provide clearance to pass the electrolysis chamber walls, against which it normally rests. The pre-collecting vessel may include any of various means for intermittently and volumetrically regulating flow of feed to be electrolyzed but it has been found that a self-triggering siphon which automatically dispenses a predetermined volume of solution into the electrolysis chamber is best. Other useful means include level detectors, floating magnets to actuate discharge valves, meters, etc., but they are not as satisfactory as the mentioned siphon and have moving parts. Below the precollecting vessel, properly located, is a stainless steel flow sensor, adapted to initiate electrolytic current flow and agitation after each discharge of the volume of the pre-collecting vessel. By electronic means the actuations of the sensor are noted and the number of current flow periods is regulated accordingly.

BRIEF DESCRIPTION OF THE DRAWING

The invention will be more fully understood by reference to the following detailed description thereof, taken in conjunction with the drawing, wherein:

FIG. 1 is a perspective view of the compact, self-contained electrolytic apparatus;

FIG. 2 is a view of the apparatus of FIG. 1, with the cover opened and the electronic panel section in exposed position, with some of the electronic circuitry having been omitted for simplification of presentation;

FIG. 3 is a vertical sectional view of the apparatus along plane 3—3 of FIG. 1;

FIG. 4 is a horizontal sectional view taken along plane 4—4 of FIG. 3, enlarged;

FIG. 5 is an enlarged vertical sectional view of the intermittent volumetric feeding and flow detecting means of the invention along a vertical plane bisecting said means and extending transversely with respect to plane 3—3 of FIG. 4;

FIG. 8 is a top plan view of a magnet of the magnetic coupling and the impeller, enlarged.

DETAILED DESCRIPTION OF THE PREFERRRED EMBODIMENT

Figure 6:
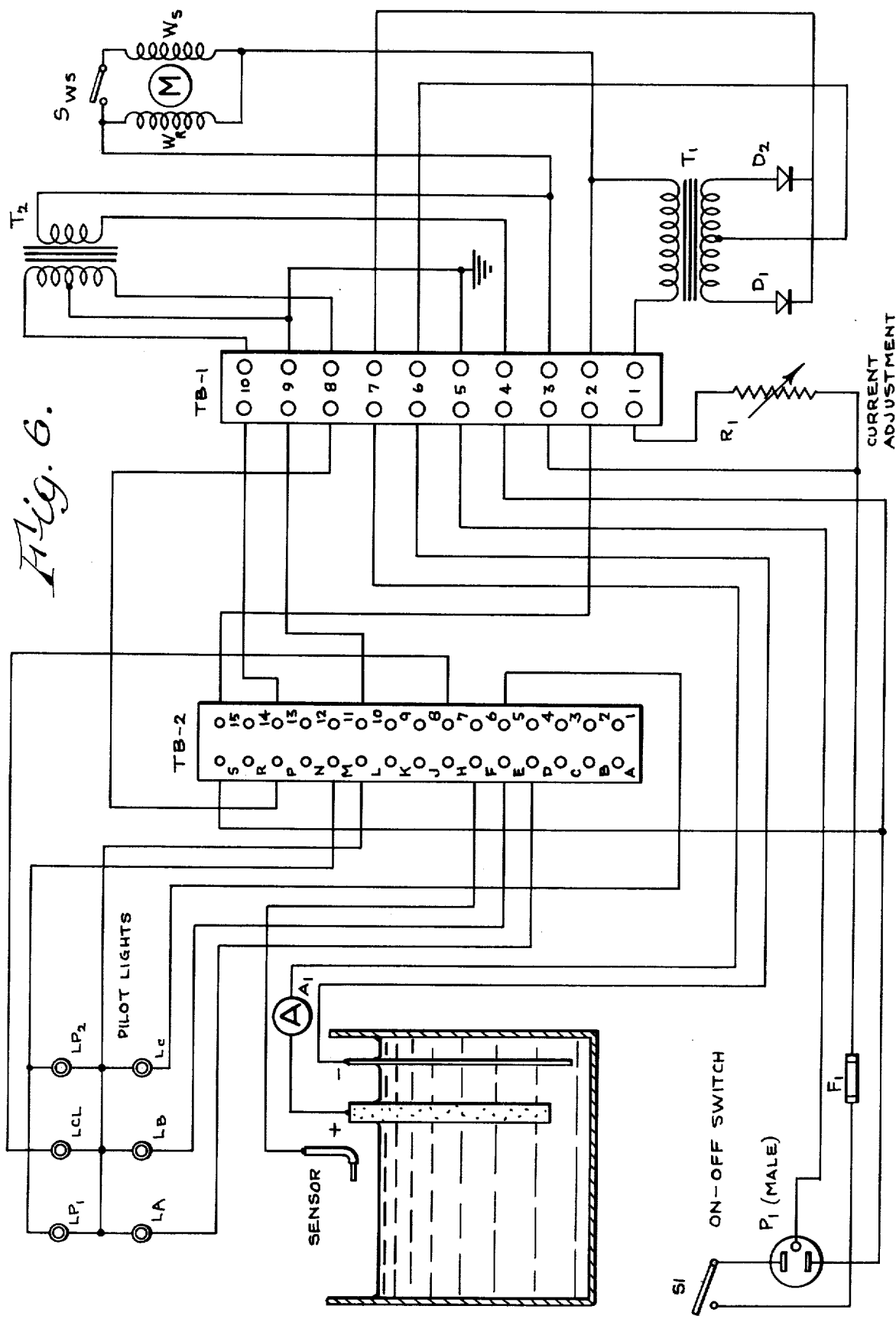
FIG. 6 is a wiring diagram for the described apparatus.

With reference now to the drawing, a brief overall description of the apparatus will first be provided, followed by a detailed description of the various elements thereof. FIGS. 1–4 show a silver recovery unit or apparatus 10 made according to the present invention and including a base or enclosure 12 and a cover 14 hinged to the base (hinges not shown). Spent photographic solution is fed into the unit 10 through an inlet tube 18 in the top of the cover 14 by means of a coupling or elbow 16 on the end of the tube 18. Tube 18 feeds the solution into a pre-collecting vessel 20 where it remains until a predetermined volume (such as 500 ml.) has accumulated, at which time the solution is automatically dispensed (due to the siphon effect) into an electrolysis vessel 22 having a chamber 24. After the solution is discharged into the chamber 24, current is automatically turned on, for a predetermined time period, between a cathode 26 and an anode 28 to plate out silver on the cathode 26. The chamber 24 is kept full up to a level 29 determined by a discharge tube or opening 30. During the time the current is on, a magnetic impeller or pump 32 in the bottom of the vessel 22 is energized to keep the solution agitated and to continuously present fresh electrolyte to the active surface (the inner surface facing the anode) of cathode 26.

Referring now in detail to the various elements of unit 10, base 12 includes a housing 34 having a support or floor 36 for supporting electrolysis vessel 22 therein. Housing 34, electrolysis vessel 22 and cover 14 are made of chemical-resistent material, preferably a fiberglass reinforced synthetic organic polymer, such as a fiberglass reinforced polyester of high molecular weight, e.g., Hetron 197A, which is impervious to mild acids and gases such as those present in photographic solutions and developed in electrolysis of such solutions. Various other polyesters and other plastics which are known to be resistant to hypo or similar photographic solutions may be substituted, e.g., polypropylenes, polyethylenes, polystyrenes, acrylics, polyethers, chlorinated and other rubbers, ABS, nylons, polyurethanes and polyvinyl halides, in reinforced form, filled, unfilled or mixed, and may be used to form self-sustaining structures or linings or coatings on bases, such as metallic, e.g., steel, or synthetic organic polymeric bases. However, of these materials the chlorendic acid-based polyesters such as the Hetron plastics made by Hooker Chemicals & Plastics Corporation, are highly preferrred. Unit 10 may have any suitable appearance, such as a wrinkle or spatter finish, but is preferably substantially flat gray or black on the external surfaces thereof so as to be non-reflective, for specific use in a darkroom.

Electrolysis vessel 22 has no opening in its lower end and is imperforate except for discharge opening or outlet 30. Vessel 22 has a central vertical centering or guiding tube or spindle 38 projecting upwardly from the bottom thereof, which guides magnetic impeller 32. Tubular spindle 38 is cemented to the bottom 31 of vessel 22 by a suitable cement, preferably an acrylic resins-based cement, although epoxy resins and various other cements known to the art as useful in the present environment may be employed.

Impeller 32, comprising disc portions 33 and 35 and vanes 37 is of polymethyl methacrylate (Plexiglas) and the parts thereof are cemented together with acrylic resin cement. As illustrated, the plurality of vanes, usually from 3 to 8, are so positioned that on rotation of the impeller in a counterclockwise direction, viewed from the top, the circulation of electrolyte agitated and moved by the impeller is outward and upward along the surfaces of cathode 26 and anode 28. Because there is no flow through the walls of anode 28 the movement of newly charged feed solution is comparatively slow and the opening 30 is large enough so that before silver from the feed reaches the discharge opening there has already been withdrawn therethrough an equivalent volume of electrolyte which is usually low in silver content or contains no silver at all. Thus, silver losses are prevented or minimized. Speeds of the impeller are normally in the 50 to 200 revolutions per minute range, preferably about 75 to 125. Such speeds avoid foaming or frothing of the electrolyte and the small vortex produced inside the anode is unobjectionable, not causing entrainment of gas in the electrolyte.

Impeller 32 is driven by communication with drive motor 47, a gear motor, which is operatively connected to speed changing (reducing) drive means 49, which, in turn, is magnetically connected to the impeller by magnets 51, 53 and 55, with flat bearing ring 44, preferably of Teflon or other low friction plastic, located between magnet 53 and vessel bottom 31. An air gap 45, of about 1/16 inch (1/32 – ⅛ inch) is between magnet 51 and bottom 31. A bushing 59 of similar material to that of ring 44 is between magnet 53 and spindle 38. Thus, impeller 32 is driven in electrolytic chamber 24 without the need for any passageway through the chamber for a drive shaft, with possible attendant leakage. Also, rectifier 57 and transformer 69, located below vessel floor 31, together with motor 47 and speed reducer 49, are protected against possible damage by leakage of electrolyte from the electrolytic chamber.

The magnetic drive assemblage for impeller 32 utilizes magnets such as that shown in FIG. 8. The magnet illustrated has north and south poles arranged as illustrated. It is of flat ring shape and is of the ceramic type, preferably being of barium carbonate and iron oxide, magnetized on one surface only in the manner illustrated in FIG. 8. Different thicknesses of such magnets may be employed or, as in the present embodiments, magnets 51 and 53, they may be composed of two such magnets held together, magnetized face to unmagnetized face. In FIG. 3 the upper face of magnet 55 is magnetized, as is the upper face of magnet 53 (a combination magnet). Magnets 51 and 55 are cemented or otherwise suitably fastened to drive means 40 and impeller disc 35, respectively. The magnets are coated with thin layers of polymeric material to protect them against loss of magnetism in the electrolyte and a preferred polymeric substance employed is an acrylic coating, such as polymethyl methacrylate. Representative of suitable acrylic cements and coatings is CADCO PS-18, manufactured by Cadillac Plastics and Chemicals Co. However, other suitable coatings, including polyfluoroethylenes, polyfluoropropylenes, e.g., Teflon, may also be employed.

Anode 28 has a central axial opening 46 therein and the bottom of the anode is positioned a short distance above the top of the impeller, such as from ½ to 1½ inches. Such a location allows the desired circulation of elecytrolyte without causing immediate mixing of feed with the balance of the electrolyte when feed is added to the electrolytic chamber. The anode is preferably of a carbonaceous material, preferably HC type solid graphite and in the present embodiment is about 6 inches in diameter and of about ½ inch wall thickness. The bottom of the cathode may be of truncated parabolic shape or cylindrical, as shown, or may be of other useful curved shapes, with the smaller portions of said curves being nearer to the bottom of the electrolysis chamber. Anode 28 is fastened to mounting platform 61, as by screws 63.

Mounting platform 61 rests on upper shoulder 65 of vessel 22. Platform 61 may also serve as the bottom 67 of a pre-collecting tank or measuring vessel 20, so that, when cover 14 is opened and electrical connections are broken, the cathode, mounting platform and pre-collecting vessel assembly may be readily withdrawn from the apparatus as a unit, merely by lifting. Thus, removal of the anode for cleaning is facilitated. Mounting platform 61 may be fastened to shoulder 65, as by mounting screws, but it has been found unnecessary to do this because the weight of the anode itself is sufficient to hold the mounting platform sufficiently tightly in place on the vessel shoulder. Mounting platform 61 is also used to serve as a mount for electrically connecting the anode with a direct current supply circuit at mounting posts 73, 75 and 77, all of which communicate with anode 28. Banana connector 79 is employed to plug into the appropriate banana receptor 80. Also, mounting platform 61 serves as a platform on which flow detecting means 81 is mounted and held in place, as by cementing to the upper surface of the platform. A contact point 83 serves to connect such flow detecting probe to banana connector 95.

Cathode 26 is normally of a metal or metal alloy and is preferably in bendable or shapable sheet form. Although other metals such as copper, platinum, platinum-iridium alloys and other ferrous alloys may also be employed, it is highly preferred to utilize ferrous alloys which are chromium-containing, preferably also with nickel, such as Type 316 stainless steel. Other stainless steels such as the other 69 standard types thereof and various special alloys, containing from 12 to 30% carbon, 0 or 1 to 22% nickel and minor amounts of carbon, columbium, copper, molybdenum, selenium, tantalum and titanium or any of these may also be utilized in suitable circumstances but Types 316, 316L and 317 are most preferred. As illustrated, the stainless steel cathode sheet is bent or folded to cylindrical shape, conforming with the inner wall of the electrolytic vessel, against which it is allowed to "unwind" and press. It will be noted from the drawing, particularly FIGS. 3 and 4, that cathode 26, pressing against the inner chamber wall, substantially forms a cylinder which is, however, incomplete, having a vertical opening between ends thereof, through which opening overflow electrolyte passes via discharge tube or opening 30. An electrical connection 54 is made near the top of the cathode to metal rod 87, which is welded to the cathode. Connection 54 is located above discharge tube or outlet 30 and above the level of electrolyte in the chamber. Rod 87 acts as part of a handle, topped by non-conductive material, e.g., wood. After removal of the mounting platform-anode-measuring vessel assembly and after disconnecting the cathode electrically, wooden handle part 89 and a matching part or parts are moved so as to diminish the radius of the cathode and then the cathode is lifted via the handles. In normal operation banana connector 91 connects the cathode to an appropriate banana receptor 93 and the banana connector is removed from the receptor when the cathode is removed, as to collect the silver therefrom (usually done by flexing and scraping). Before use the inner surface of the cathode (facing the anode) is pre-plated with silver but after the first plating of recovered silver onto the cathode and removal thereof, enough remains so as to obviate additional pre-plating and still allow plating from solutions low in silver content, such as the usual spent hypos. Also, the plated recoverable silver is readily removed from the cathode and is highly pure when analyzed.

The measuring means 19 for automatically intermittently volumetrically feeding irregularly charged spent photographic solution to the electrolysis vessel includes pre-collecting vessel 20, having a cylindrical side wall and utilizing part of platform 61 as a bottom therefor. It also includes a mounting top portion 21 and a self-triggering siphon sub-assembly which comprises a discharge tube 23, which passes through bottom 61, and tube 25, having a closed upper end 27, under the middle of which end there is a protuberance 39, centrally located above tube 23 with the bottom of the protuberance level with the top of tube 23 or approximately level therewith. Adjusting screw 41 is provided to provide a means for control of the height of tube 25 with respect to tube 23, so as to allow accurate control of passage 42 between the tubes. Normally, the bore of tube 23 and the annular cross-section between tubes 23 and 25 will be at least 0.2 square inch but may be greater than this, usually up to one square inch, to provide for rapid flow of liquid and the passageway above the walls of tube 23 will be about 0.05 to 0.2 inch wide, preferably about 0.1 inch. With such dimensions for the mentioned passageway, and aided by the presence of the protuberance or other modification of related portions(s) of tubes 23 and 25, the siphon produced is self-triggering and the surface tension of the fluid being passed prevents or substantially prevents non-siphoning flow of liquid through tube 23. Of course, the volume of liquid discharged at each operation of the siphon depends on the diameters of vessel 20 and tube 23 and the height of tube 25. Because the surface tensions of materials siphoned may vary, adjustment screw 41 is desirable for at least initial adjustment of passageway 42. However, after adjustment the screw and tube 25 are normally cemented or otherwise fastened together to prevent changing of the height of passageway 42 during use. In some instances, where the surface tension of the material being treated and the characteristics of the tubes are well known, the adjustment capability of the self-triggering siphon assembly may be omitted and screw 41 may be replaced by ordinary mounting means, accurately positioning the tubes.

Although the self-triggering siphon is of such construction as to prevent dripping or non-siphoning overflowing of liquid from pre-collecting vessel 20, in some rare instances such dripping can occur, as at the end of a siphon discharge. Because the means responsive to the feeding of the feed solution to the electrolysis chamber, which causes the passing of a plating current through the electrolyte in the chamber, could be activated by such a dripping of feed solution, means are provided so that any flow signaled by detector 81 can be distinguished as either a steady stream or a drip. Detector or sensor 81 is electrically connected through a stream of feed solution to the electrolyte and through it to a ground, thereby completing a circuit and allowing a flow of electricity that can indicate a flow condition. Such condition is noted electronically by counting means and the flow of a plating current sufficient to plate out the silver in the discharge volume of feed is stimulated or the counter-computer stores the information and causes future flow of such current if a plating operation is already in progress. It has been noted that short flows, drips and rebounds of droplets from the electrolyte into contact with the sensor all may cause actuation of the counter and therefore, there is provided means, which will be evident from the wiring and circuit diagrams of FIGS. 6 and 7, for delaying counting until a sufficient time has passed, e.g., 2–5 seconds, which is evidence of a true flow condition. Sensor 81 is connected by wire 85, contact 83, banana connector 95 and banana receptor 97 to the electronic circuitry described. Other flow sensing and signalling devices that perform the same function may also be utilized, in replacement of that described, although they are not as preferable.

When the self-discharging siphon dispenses the measured amount of spent photographic solution feed to the electrolysis chamber, a plating current is supplied between the electrodes and the agitating means is started. The flow of electricity is such that an amount equal to or up to at the most 20% more than that needed to plate out all the silver charged is passed between the electrodes and preferably, this amount is about 10% in excess of theoretical. Thereby, all the recoverable silver is plated out without any undesirable amount of current being passed when there is no silver to plate (which could result in undesirable hydrogen sulfide generation). Also, the agitator or circulating means provided keeps fresh electrolyte in contact with the electrodes, preventing undesirable localized reactions. After the allowed time period for plating at the desirably low current densities and voltages utilized has expired the current is shut off and the agitator is halted automatically, awaiting the next discharge of feed for reactivation.

Other parts of the apparatus illustrated in FIGS. 1–3 include instrument compartment door 82 hingedly fastened to enclosure 12 and containing printed circuit board 84, terminal block 86 (TB-2) connecting wires, ammeter 88 and pilot or service lights 90. The hinged cover is shaped to fit over the front circuit panel and is provided with locking means, not shown, for simultaneously sealing both the circuit panel section and the electrolysis portion of the unit with hasp means. On the front of base 12, near the bottom thereof, are on-off switch 92, fuse 94 and current adjustment knob 96. Inside the bottom section of base 12, under electrolysis vessel 22, are located another terminal block (TB-1), the adjustable resistor portion of the current regulator and various wiring connections, not shown in FIGS. 1–4.

Figure 7:
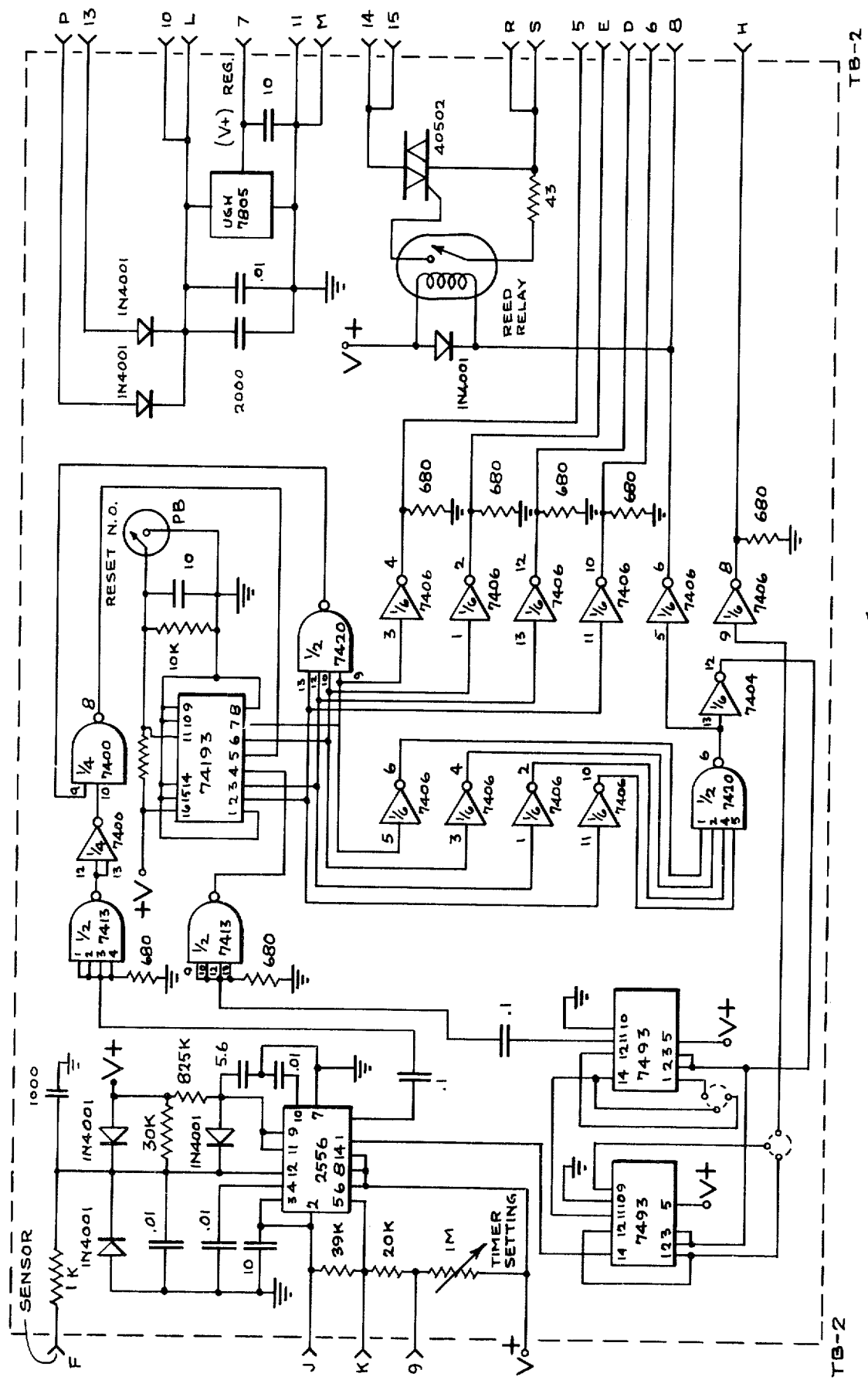
FIG. 7 is a circuit diagram for the counter and timer mechanism employed.

Details of the various electrical elements and connections are given in the wiring diagram of FIG. 6 and the circuit board diagram of FIG. 7. Because these electrical diagrams are considered to be complete in themselves, satisfactorily describing the components utilized to obtain the desired effects previously mentioned, they will not be referred to in detail herein. Suffice it to say that in conjunction the drawings shown the connections of the electrodes and sensor to means for actuating the agitator motor and for passing a direct current to the electrodes in response to dropping of a charge of feed to the electrolysis vessel. They also illustrate means for adjusting the current flow for setting the time for which the electrolytic current is passed and for turning the unit off or on. Counting and time delay means are illustrated, as well as re-setting means. The diagrams given are for preferred embodiments.

The apparatus is designed to operate on 110 volts, normally using from 50 to 100 watts, preferably about 75 to 80 watts under full operation and an average of about 20 to 40 watts, preferably about 30 watts under normal operation, which would be about 0.7 kilowatt-hours over a 24-hour period. If 220 volt operation is desired a step-down transformer may be used ahead of the unit.

Operation of the present machine and effecting of the processes are simple. First, a chemical test is made of the silver-bearing fixer solution from which silver is to be recovered and a typical monthly consumption of fixer solution is determined. Knowing these two factors, an operating point is chosen which accommodates the maximum possible or probable flow and still allows the lowest possible plating current to be utilized. Current control (by the large primary circuit resistor) is adjusted for the recommended current and the smaller computer board potentiometer (on the printed circuit board) is adjusted for the correct time, so that the amount of electricity passed per discharge of feed solution to the electrolysis zone will be that required to plate out the silver content thereof, preferably plus 10%.

Each time the automatic siphon dumps its contents (usually from 0.5 to 2 liters, preferably about 0.5 liter) into the electrolysis vessel a liquid connection occurs between the sensor probe (below the tube of the siphon) and the conductive solution in the main tank, which is grounded because the anode is grounded. This grounding of the sensor indicates to the computer (printed circuit board) that 0.5 liter of solution has been added to the machine and the machine then begins to agitate and plate out the silver in solution. The computer turns on the plating circuit and the magnetic agitator at the same time, accomplishing this switching action by a triac-reed switch combination in order that the 120 volts signal for operation of the motor and plating transformer can be controlled without the use of undesirable relays.

If for some reason, as often happens in actual operation, a second volume of feed solution is discharged to the plating chamber before the plating out of the silver in a preceding feed is complete, the computer has the ability to store this information and will make process time available for the second charge as soon as the passage of electricity to plate out silver from the previous charge or charges has been completed. The present unit, by virtue of the computer, can store at one time knowledge of as many as sixteen feeds, thereby assuring that the correct amount of electricity will be passed to plate out all the silver charged, without passing so much electricity as to cause undesirable side effects.

The following example illustrates operation of the processes of this invention and use of the described apparatuses.

EXAMPLE

In a hospital x-ray developing operation it is noted that the average silver concentration (density) is about 1.0 troy ounce (31.1 grams) of silver per gallon. Although more complicated and more accurate analytical techniques may be employed it has been found satisfactory to utilize a silver-sensitive paper, such as that made by Johnson Products, Ltd., of England. The monthly consumption of fixer is determined and is found to be about 150 gallons so that about 5 ounces of silver per day should be recoverable. To plate out this amount of silver requires, for the ammonium-based fixer used, about 45 ampere hours. Since the operation of the photographic laboratory is over an 8 hour period and it is desirable to have the plating occur over approximately the same period, eight hours operation at 6 amperes provides about the right amount of electricity to completely plate out all the recoverable silver present plus 10%. The main rheostat is therefore set so that the current is 6 amperes. Thus, using the machine previously described and plating out at 6 amperes, 5.3 minutes of electrolysis are employed per discharge of feed solution. This setting is made on the trimmer potentiometer located on the printed circuit board inside the unit door and the apparatus is now ready for automatic operation. It is set up with an overflow from the spent hypo tank feeding the pre-collecting vessel through the coupling and tube illustrated and continues to operate automatically whenever there is spent hypo solution feed to be electrolyzed. During the electrolysis period the recoverable silver content is diminished to nil and analysis of the effluent shows no recoverable silver therein. Every month a service man opens the machine, removes the cathode by moving the handles to make it into a smaller cylinder, and lifting, scrapes the silver off, replaces the cathode and weighs the silver collected. The amount of silver recovered is at the rate of abut 5 troy ounces of 95 to 99% pure silver per day, being 150 ounces after 30 days of operation.

Whereas in the operation described the average voltage employed in the beginnings of the electrolyses is abpit 2.5 volts (average voltage of the rectified current) and the effective area of the electrode (area of the inner face) is about three square feet, the same plating operation is carried out at: other voltages, from 1.0 to 3 volts, sometimes being as low as 0.5 volt but preferably being 1.5 to 3 volts; other current densities, from 0.4 to 5 amperes/sq. ft. of cathode surface; other currents, from 1 to 20 amperes, preferably 3 to 15 amperes, more preferably, when feasible, 3 to 8 amperes; and for other time periods, such as from 1 or 2 to 20 minutes. Also, the ratio of the volumes of the pre-collecting vessel and the electrolysis chamber in the present case is 1:26.5 but ratios of such volumes from 1:10 to 1:100 are employed. Furthermore, cathode surface areas are changed in the range of 2 to 10 sq. ft./liter of photographic solution charged per drop. In such cases effective silver recovery from hypos containing from ⅛ to 1½ troy ounces of silver/gallon are obtained. Also, when electrode connections are reversed and the carbonaceous anode is made cathodic, silver is also platable on it. The method is also used to plate out only half of the silver from the hypo by setting the timer for half the time (or by halving the current). In such cases, instead of being sewered, the overflow electrolyte is returned to the fixer tank as restored fixer.

The present units are so compact that they occupy only about two square feet of floor space, which is important for installation and use in high-cost areas, such as hospital darkrooms. They are also trouble-free and require little attention. However, there is no low limit to their size and they can be of such dimensions as to occupy from 1 to 10 square feet of floor space, with silver collecting action being roughly proportional to the floor area covered.

The invention has been described with respect to various specific embodiments and examples thereof but is not to be limited to these since it is evident that one of skill in the art will be able to utilize substitutes for and equivalents of various elements of the apparatus and method without departing from the invention.

What is claimed is:

1. An apparatus for recovering silver from a photographic solution which comprises (a) an electrolysis vessel having an electrolysis chamber therein; (b) a carbonaceous anode in said chamber; (c) a metallic cathode in said chamber; (d) a rotary impeller for circulating electrolyte within said chamber into contact with the cathode; (e) a self-triggering siphon for intermittently feeding to the electrolysis chamber a given volume of the photographic solution from which silver is to be recovered; and (f) means responsive to the feedings of a plurality of said measured volumes of feed solution to the chamber, for passing a direct plating current of electricity between said anode and cathode and through a solution of electrolyte in said electrolysis chamber containing said measured volumes of feed solution, in predetermined quantity to plate out silver on the cathode in an amount which is from a substantial proportion to all of the silver recoverable by plating from the plurality of said measured volumes of feed solution fed to the electrolysis chamber, which means is activated by contacts with a plurality of the measured volumes of feed solution as the feed solution is fed to the electrolysis chamber and which includes electronic means for counting the number of volumetric discharges and actuating means to pass sufficient electricity between the electrodes to plate out the silver from the number of measured volumes of feed solution so fed to the electrolysis chamber, said electronic means for counting the number of volumetric discharges including a sensor connected to electronic circuitry capable of distinguishing between dripping and continuous flowing of feed solutions from the siphon and of initiating electric current flow between the electrodes by means of the actuating means in response to said continuous flows of feed solution from the siphon and not in response to drippings of such solution therefrom.

2. An apparatus according to claim 1 wherein the anode and cathode are readily removable from the electrolysis vessel, the anode is substantially centrally located in the vessel, the cathode is located about the anode and the impeller is driven by means of a motor which is magnetically coupled therewith.

3. An apparatus according to claim 2 wherein the anode is of graphite, the cathode is of stainless steel, the electrolysis vessel is of solution-resistant synthetic organic polymeric material and the means for intermittently volumetrically feeding the photographic solution feed to the electrolysis chamber is a precollecting vessel of solution-resistant synthetic organic polymeric material in which there is located a siphon os such a material, which siphon feeds from a predetermined volume of feed from the pre-collecting vessel to the electrolysis chamber intermittently as the pre-collecting vessel is charged to its determined capacity with feed.

4. An apparatus according to claim 3 wherein the electrolysis chamber, defined by the vessel wall, is of vertical cylindrical shape, the anode is a hollow cylinder of graphite centrally positionable coaxially with the cylindrical electrolysis chamber, the cathode is a stainless steel sheet coated with silver on a face thereof, shaped to conform to the inner wall of the electrolysis vessel and adjacent thereto, with the silver coating on the face nearer to the anode, readily removable from the chamber by bending to a smaller diameter cylinder and lifting and the impeller is located in the electrolysis chamber below the anode and operates to direct a flow of electrolyte over the interior surface of the cathode and to draw feed solution into it and discharge it into electrolyte directed into contact with the cathode.

5. An apparatus according to claim 4 wherein the precollecting vessel is atop the electrolysis chamber and contains the self-triggering siphon therein, said pre-collecting vessel and the anode being fastened to a mounting plate through which electrical connections are made to the anode and through which electrical connection is made to the flow sensor, the mounting plate being restable or readily removably mountable on the top of the chamber wall, the self-triggering siphon discharges to the hollow interior of the anode, the cylindrical anode wall is sufficiently imperforate so as to limit liquid circulation therein to slow the mixing of feed discharge from the precollecting chamber to the body of the electrolyte, the electrolysis vessel wall defining the electrolysis chamber has an overflow discharge opening therein through which a volume of electrolyte equal to that of feed charged is intermittently discharged, the electrolysis chamber wall is otherwise imperforate and the magnetic coupling of the impeller and drive motor is at the bottom of the electrolysis chamber, includes magnetic discs composed of pluralities of curved magnets fitted together with like poles in contact, a spindle on the bottom of the electrolysis chamber about which the magnets and the impeller rotate, such a magnet being held to the impeller and another such magnet being held to a rotating shaft of driving means, said driving means being located intermediate a drive motor and the electrolysis chamber.

6. An apparatus according to claim 5 which is self-contained and may be locked to prevent unauthorized access to it and wherein a hinged top and a hinged front electronic panel section are provided, the panel section includes banana contact receptors, the anode has a banana contact communicated to a plurality of positions thereon, which contact, when positioned in one of the receptors, conducts direct current to the anode, as desired, the cathode is connectable via a banana connector with an appropriate banana receptor on the electronics panel section and the flow sensor is similarly connectable, means are provided for feeding photographic solution from which silver is to be removed through the top of the apparatus to the pre-collecting chamber, rectifying means are located below the electrolysis chamber to convert alternating current utilized to direct current for plating out of the silver and transformer means are similarly located.

7. An apparatus according to claim 1 wherein the electrolysis chamber is of vertical cylindrical shape open at the top thereof and having an opening in the cylindrical wall for the removal of electrolyte from the chamber and the cathode is an incomplete cylinder inside the chamber and conforming to the inner side wall thereof, removable therefrom by bending it into a smaller cylinder and pulling it directly upwardly, the electrode being of such a size as to form a substantially complete cylinder having a vertical opening between vertical ends thereof when in position against the inner chamber wall, which electrode is positioned so as to allow passage of electrolyte through the opening between the electrode ends and through the opening in the chamber wall.

8. An apparatus according to claim 1 including, as the means for intermittently volumetrically feeding solution to the electrolysis chamber, a self-triggering siphon comprising a container having a bottom, a side wall and an outlet tube for the discharge of fluid from the container, which tube extends upwardly and has an opening at the top thereof, and an enclosing tube having a side wall, a closed top and an open bottom, so positioned on the discharge tube as to form a passageway for fluid to move upwardly annularly between the tubes, across an end space between them and downwardly through the inner tube, in which the surface tension of the fluid passed prevents the non-siphoning flow of liquid through the inner tube.

9. An apparatus for recovering silver from a photographic solution which comprises (a) an electrolysis vessel having an electrolysis chamber therein; (b) an anode in said chamber; (c) a cathode in said chamber; (d) means for circulating electrolyte within said chamber into contact with the cathode; (e) self-triggering siphon means for intermittently feeding to the electrolysis chamber a given volume of the photographic solution from which silver is to be recovered; and (f) means responsive to the feedings of a plurality of said volumes of feed solution to the chamber, for passing a plating current of electricity between said anode and cathode and through a solution of electrolyte in said electrolysis chamber containing said measured volumes of feed solution, in a predetermined quantity to plate out silver on the cathode in an amount which is from a substantial proportion to all of the silver recoverable by plating from the plurality of said measured volumes of feed solution fed to the electrolysis chamber.

10. An apparatus according to claim 9 wherein the electric current is a direct current and the means for passing the current between the anode and the cathode and through the solution of electrolyte in the electrolysis chamber in predetermined quantity is activated by contacts with a plurality of the measured volumes of feed solution as the feed solution is fed to the electrolysis chamber.

11. An electrolytic apparatus which comprises an electrolysis chamber, an anode and a cathode in the chamber, impeller means for circulating electrolyte within said chamber, first magnetic means in said chamber and in operative communication with said impeller means, which first magnetic means includes a magnet covered with electrolyte-resistant material and of a plurality of circular segments with adjacent ends thereof having the same magnetic polarities, driving means external to said chamber and out of communication with electrolyte therein and second magnetic means in operative connection with said driving means, external to said chamber and in magnetic connection with the first magnetic means, thereby operatively communicating with the impeller, the first and second magnetic means being of flat cylindrical shapes with flat faces thereof opposed to one another.

12. An apparatus for recovering silver from a photographic solution which comprises (a) an electrolysis vessel having an electrolysis chamber therein; (b) an anode in said chamber; (c) a cathode in said chamber; (d) impeller means within the electrolysis chamber for circulating electrolyte within the electrolysis chamber into contact with the cathode, which impeller means is magnetically connected to driving means by means of flat magnets, at least one of which, located in the electrolysis chamber, is circular, and which magnets have their flat faces opposed, said magnets each being of ceramic material composed of barium carbonate and iron oxide, magnetized on a flat surface thereof with a plurality of north and south poles and with poles of like sign adjacent to one another; (e) means for intermittently feeding to the electrolysis chamber a given volume of the photographic solution from which silver is to be recovered; and (f) means responsive to the feedings of a plurality of said measured volumes of feed solution to the chamber, for passing a plating current of electricity between said anode and cathode and through a solution of electrolyte in said electrolysis chamber containing said measured volumes of feed solution, in a predetermined quantity to plate out silver on the cathode in an amount which is from a substantial proportion to all of the silver recoverable by plating from the plurality of said measured volumes of feed solution fed to the electrolysis chamber.

13. An apparatus for recovering silver from a photographic solution which comprises (a) an electrolysis vessel having an electrolysis chamber therein; (b) an anode in said chamber; (c) a cathode in said chamber; (d) means for circulating electrolyte within said chamber into contact with the cathode; (e) means for intermittently feeding to the electrolysis chamber a given volume of the photographic solution from which silver is to be recovered; and (f) means responsive to the feedings of a plurality of said measured volumes of feed solution to the chamber, for passing a direct plating current of electricity between said anode and cathode and through a solution of electrolyte in said electrolysis chamber containing said measured volumes of feed solution, in a predetermined quantity to plate out silver on the cathode in an amount which is from a substantial proportion to all of the silver recoverable by plating from the plurality of said measured volumes of feed solution fed to the electrolysis chamber, which means is activated by contacts with a plurality of measured volumes of feed solution as the feed solution is fed to the electrolysis chamber and which includes electronic means for counting the number of volumetric discharges and actuating means to pass sufficient electricity between the electrodes to plate out the silver from the feed solution so fed to the electrolysis chamber.

14. An apparatus for recovering silver from spent photographic solutions comprising an electrolysis chamber of vertical cylindrical shape open at the top thereof and having an opening in a cylindrical wall for the removal of electrolyte from the chamber, a flat metal sheet first electrode inside the chamber and conforming to the inner side wall of the chamber, which is removable therefrom by bending it into a smaller cylinder and pulling it directly upwardly, which electrode is of such a size as to form an incomplete cylinder when in position against the inner chamber wall and substantially forms such a cylinder, having a vertical opening between vertical ends of the sheet, which incomplete cylindrical electrode is positioned so as to allow passage of electrolyte through the opening between the electrode sheet ends and through the opening in the chamber wall, a second electrode in the electrolysis chamber located within the incomplete cylinder of the first electrode and sources of electricity of opposite signs communicating with both the first and second electrodes.

15. An apparatus according to claim 14 wherein the first electrode is a flat stainless steel sheet cathode contacting the chamber inner side wall adjacent thereto, without electrical connections through said side wall to said electrode, and said electrode is communicated with a source of electricity by an electrical connection at the top of the electrode above the opening in the cylindrical wall for the removal of electrolyte from the electrolysis chamber.

* * * * *